United States Patent [19]

Simeth

[11] 4,407,198

[45] Oct. 4, 1983

[54] ARRANGEMENT FOR SECURING PURE SKEW ADJUSTMENT OF A PLATE CYLINDER IN A SHEET-FED ROTARY PRINTING PRESS

[75] Inventor: Claus Simeth, Offenbach am Main, Fed. Rep. of Germany

[73] Assignee: M.A.N.-Roland Druckmaschinen Aktiengesellschaft, Fed. Rep. of Germany

[21] Appl. No.: 406,347

[22] Filed: Aug. 9, 1982

Related U.S. Application Data

[63] Continuation-in-part of Ser. No. 368,904, Apr. 15, 1982.

[51] Int. Cl.[3] ........................ B41F 13/24; F16H 13/06

[52] U.S. Cl. ........................................ 101/248; 74/395

[58] Field of Search ................. 101/179, 248, 23, 181; 74/395

[56] References Cited

U.S. PATENT DOCUMENTS

| | | | |
|---|---|---|---|
| 2,892,206 | 5/1961 | Peyrebrune | 101/248 X |
| 2,957,409 | 10/1960 | Foulks | 101/248 X |
| 3,516,352 | 6/1970 | Lewis | 101/248 X |
| 3,750,568 | 8/1973 | Weisgerber | 101/248 |

FOREIGN PATENT DOCUMENTS

| | | | |
|---|---|---|---|
| 395413 | 7/1933 | United Kingdom | 101/248 |
| 1163854 | 9/1969 | United Kingdom | 101/248 |

*Primary Examiner*—E. H. Eickholt

*Attorney, Agent, or Firm*—Leydig, Voit, Osann, Mayer & Holt, Ltd.

[57] ABSTRACT

An arrangement for securing pure skew adjustment of a cylinder, for example, a plate cylinder in a sheet-fed rotary printing press relative to an adjacent blanket cylinder. A bearing assembly at one end of the plate cylinder includes a cylinder bearing telescoped over the shaft and having flat support surfaces thereon facing radially outward in opposite directions. A guide bearing having a cylindrical outer surface is formed with a central window for receiving the cylinder bearing. The window defines a pair of flat inwardly facing way surfaces spaced parallel to one another for snug reception of the flat support surfaces on the cylinder bearing. The window also defines side walls spaced sufficiently to permit freedom of adjustment of the cylinder bearing along the way surfaces. An eccentric sleeve is fitted between the guide bearing and the frame with means for rockably adjusting the same to move the plate cylinder toward and away from the blanket cylinder thereby to vary the impression. A second adjustment is interposed between the cylinder bearing and the frame for locating the cylinder bearing in a desired position along the way surfaces thereby to adjustably skew the plate cylinder with respect to the blanket cylinder. A key anchored to the frame is provided for holding the guide bearing in a phase position in which the way surfaces therein are constantly oriented perpendicular to a plane which normally contains the axes of the cylinders, notwithstanding the rocking movement of the sleeve.

6 Claims, 6 Drawing Figures

ARRANGEMENT FOR SECURING PURE SKEW ADJUSTMENT OF A PLATE CYLINDER IN A SHEET-FED ROTARY PRINTING PRESS

This is a continuation-in-part of application Ser. No. 368,904, filed Apr. 15, 1982.

In multicolor lithographic printing separate plates are photographically made for each of four colors of ink, and applied to the sheet in succession to form the final colored reproduction. It is essential that the successive impressions be in precise register with one another, and to achieve this condition the lock-up devices which secure each plate to its printing cylinder are adjustable so that the plates may be moved in small increments both laterally and peripherally.

To complicate the matter, and unless special care is taken in the production of a plate, the image on the plate may be slightly twisted or "skewed" requiring a compensatory skew adjustment of the plate on the cylinder. Skewing of the plate on its cylinder requires the highest skill of the pressman and is extremely time consuming greatly increasing the expense of set-up.

It has been proposed that in lieu of skewing a plate with respect to the cylinder upon which it is mounted, the cylinder itself might be skewed. An arrangement of this type is described, for example, in German Patent Disclosure No. 28 17 075 which was laid open on Nov. 30, 1978. This publication discloses an arrangement in which one the plate cylinder bearings has an eccentric housing which is engaged, at its periphery, by a manually operated adjusting rack. While rotational adjustment of the bushing is effective to skew the cylinder, the skew adjustment also results in a component of motion toward or away from the associated cylinder resulting in an unwanted change in the axial spacing between the cylinders at the adjusted end; in other words, the degree of "impression" or running pressure between the cylinders is changed. As a result after the desired skew has been achieved, the cylinders must be further adjusted to reestablish the desired impression.

Consequently, it is an object of the present invention to provide means for securing pure skew adjustment of a cylinder, for example, a plate cylinder in a sheet-fed rotary printing press without disturbing the interaxial spacing of the two cylinders, that is, without changing the level of force or impression between the two cylinders. In other words, it is an object to provide an adjusting arrangement, particularly applicable to a plate cylinder, in which the plate cylinder may be slightly skewed in one direction or the other with respect to the frame and cooperating blanket cylinder, in order to precisely compensate for skew in the image of the plate, while keeping impression constant.

It is a related object to provide, at one end of a plate cylinder, a bearing assembly which includes provision for adjusting both skew and impression and in which these adjustments, secured by separate manually operated levers, are independent of one another.

It is a general object of the present invention to provide a bearing assembly to be used at one end of a plate cylinder to achieve separate adjustment of skew and impression which is nevertheless simple and inexpensive to construct and install, which is universal in application both for new presses and in presses already in the field on a retrofit basis, in which the two adjustments can be easily executed by a pressman having limited skill or experience, and which is highly reliable requiring substantially no maintenance over the life of the press in which it is installed.

Other objects and advantages of the invention will become apparent upon reading the attached detailed description and upon reference to the drawings in which.

While the invention has been described in connection with a preferred embodiment, it will be understood that there is no intention to limit the invention to the particular embodiment shown but it is intended, on the contrary, to cover the various alternative and equivalent forms of the invention included within the spirit and scope of the appended claims.

Figure 1:
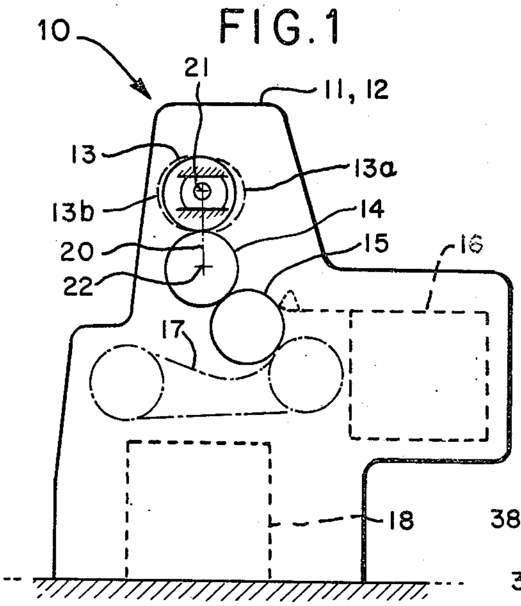
FIG. 1 is a highly simplified elevational view of a form of lithographic printing press incorporating the present invention.
Figure 5:
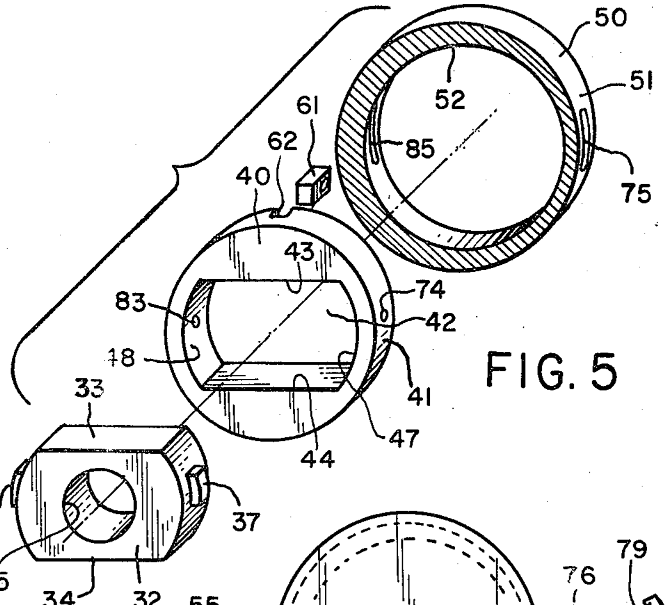
FIG. 5 is an exploded perspective.

Turning to FIG. 1 of the drawings there is shown a typical lithograph press 10 having a frame which includes side plates 11, 12. Journalled in the side plates are a set of cylinders including a plate cylinder 13, a blanket cylinder 14 and an impression cylinder 15. Individual sheets are fed to the impression cylinder from a feeder pile 16, as is well known in the art.

In operation, the plate mounted on the plate cylinder 13 (and which is supplied with films of ink and water by means not shown) applies a printed impression to the blanket on cylinder 14, which printed impression then "offsets" onto a sheet (not shown) carried by the impression cylinder 15. The printed sheet is then removed by a takeoff system indicated at 17 which deposits the sheet on a delivery pile 18. Or, in the case of a multicolor press installation, the sheet is transferred by a conveyor (not shown) to the successive press units in the line.

The plate and blanket cylinders are normally mounted so that axes 21, 22 thereof are contained in a common plane 20, that is, the cylinders are normally mounted perfectly parallel to one another.

Figure 2:
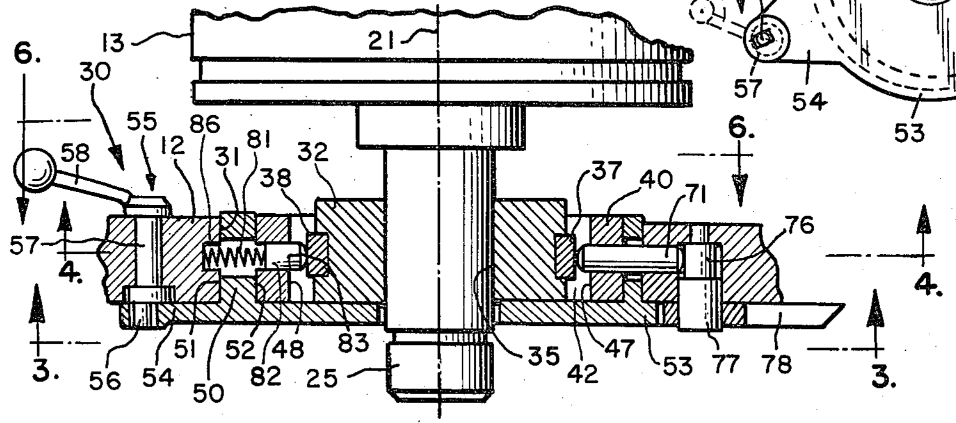
FIG. 2 is a generally horizontal section taken through a bearing assembly at one end of the cylinder and looking along line 2—2 in FIG. 3.
Figure 3:
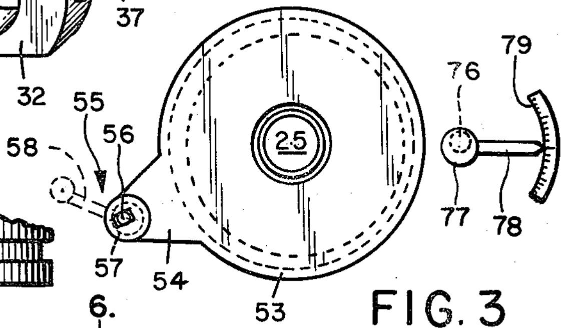
FIG. 3 is an external end view of the assembly looking along the line 3—3 in FIG. 2.
Figure 4:
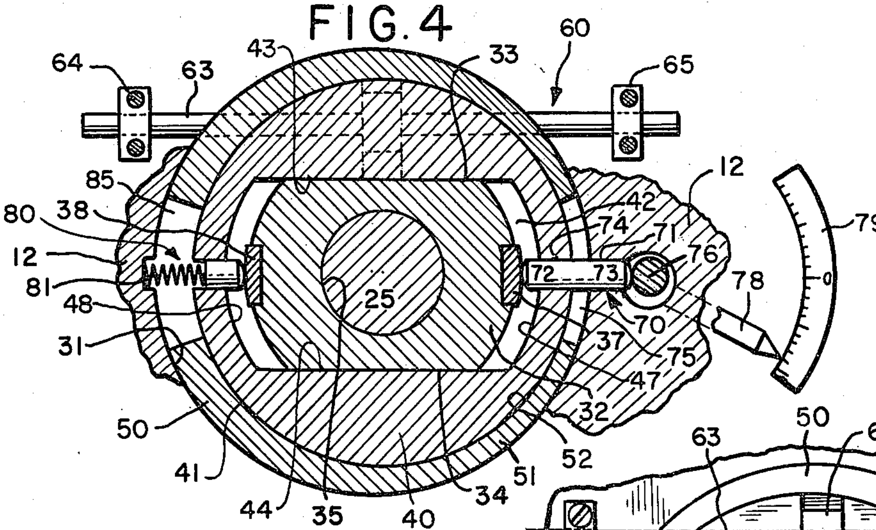
FIG. 4 is a cross section, in elevation, looking along line 4—4 in FIG. 2.

Focusing attention upon the plate cylinder 13 as shown in FIGS. 2–4, it includes stub shafts 25 which are coaxial. The stub shaft at the drive end of the cylinder is mounted in a conventional bearing in the frame side plate 11 (not shown) while the stub shaft 25 at the remote, or movable, end of the cylinder is mounted in a special bearing assembly 30, to be described, and which is fitted in a cylindrical opening 31 in the side plate 12.

In accordance with the present invention the bearing assembly includes a cylinder bearing telescoped over the shaft and having flat support surfaces thereon which face radially outwardly in opposite directions. The cylinder bearing is mounted in a guide bearing having a cylindrical outer surface and a central window, the window defining a pair of flat inwardly facing way surfaces spaced parallel to one another for snug reception of the flat support surfaces on the cylinder bearing. The window also has side walls which are spaced from one another sufficiently to permit freedom of adjustment of the cylinder bearing along the way surfaces, thereby to skew the axis of the plate cylinder. An eccentric sleeve is fitted between the frame and the guide bearing to move the cylinder 13 toward or away from, the cylinder 14 to vary the impression. However, means are provided, secured to the frame, for holding the guide bearing constantly in a phase position in which the way surfaces thereon are perpendicular to the plane which contains the axes of the cylinders, notwithstanding the rocking movement of the sleeve.

Thus, referring to FIGS. 2–5, there is provided a cylinder bearing 32 having flat, parallel support surfaces 33, 34 which face radially outward in opposite directions, with a central opening 35 for the shaft. Bearing 32 has side surfaces fitted with hardened inserts 37, 38 for a purpose to be described.

Surrounding the cylinder bearing is a guide bearing 40 having a cylindrical outer surface 41 and a central window 42. The window defines a pair of flat inwardly facing way surfaces 43, 44 which are spaced parallel to one another for snug reception of the support surfaces 33, 34 on the cylinder bearing. The window also defines side walls 47, 48 which are spaced sufficiently from one another to permit freedom of positional adjustment of the cylinder bearing 32 along the way surfaces. The limits of adjusting movement are indicated at 13*a* and 13*b* in FIG. 1.

For adjusting the transaxial distance between the cylinders 13, 14 thereby to vary the impression, an eccentric sleeve 50 having cylindrical, but axially offset, outer and inner surfaces 51, 52, respectively, is fitted between the guide bearing 40 and the cylindrical opening 31 in the press frame.

For the purpose of rockably adjusting the eccentric sleeve to move the plate cylinder 13 toward and away from the blanket cylinder 14, the eccentric sleeve is provided with an integral front plate 53 having an arm 54 which is swung by a manual adjusting mechanism 55. The manual adjusting mechanism includes an eccentric pin 56 which is mounted upon a shaft 57 fitted in the frame, the shaft having, at its inner end, a manual operating lever 58. Swinging the lever in one direction or the other causes corresponding rocking movement of the eccentric sleeve 50, by reason of the eccentric pin 56, resulting in an increase or decrease in impression, as may be desired. Corresponding means, not shown, may be provided at the drive end of the cylinder to permit equalization of the impression over the entire length of the cylinder.

Figure 6:
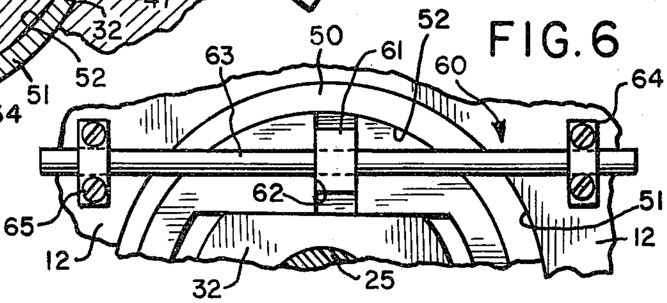
FIG. 6 is an elevational view looking along line 5—5 in FIG. 2.

For the purpose of ensuring independence between the skew adjustment and the impression adjustment regardless of the phase position of the eccentric sleeve, means are provided for holding the guide bearing 40 constantly in a phase position in which the way surfaces 43, 44 therein are perpendicular to the plane 20 which normally contains the axes 21, 22 of the cooperating cylinders. Such locating means, indicated generally at 60 (FIG. 6), is in the form of a key, or block, 61 which engages a radially formed groove 62 in the backside of the guide bearing 40. The key is mounted upon a rod 63 which extends perpendicularly to the plane 20 and which is fixed in brackets 64, 65 secured by any suitable means to the backside of the side plate 12 of the frame. Since movement of the axis 21 of the plate cylinder at right angles to the plane 20, which is common to the two cylinders does not effect impression, and since the locating mechanism in the form of key 61 ensures that the orientation of the way surfaces 43, 44 with respect to the plane 20 will remain constant, the rocking of the eccentric sleeve 50 will have substantially no effect upon skew, at least within its limited range of movement, and, conversely, adjustment of skew will have no effect upon impression.

As a further feature of the invention adjusting means are interposed between the press frame and the cylinder bearing to adjust and maintain the plate cylinder in a skewed position offset in either direction from the normal central position. More specifically, a plunger is provided which penetrates the side wall of the guide bearing, with the inner end of the plunger in engagement with the cylinder bearing and with a cam shaft journalled in a frame plate at the outer end of the plunger for shifting the plunger to a desired position. The adjusting mechanism, indicated generally at 70, thus includes a plunger 71 having an inner end 72, which engages the hardened insert 37, and an outer end 73. The plunger is slidably mounted in an opening 74 in the guide bearing and passes through a peripherally elongated clearance opening 75 in the eccentric sleeve. The outer end 73 of the plunger engages a cam 76 on a shaft 77 which is journalled in the frame side plate and which has a manual operating arm 78 at its forward end. The arm 78, if desired, may have a calibrated "skew" scale 79.

For the purpose of constantly urging the cylinder bearing 32 into seated engagement with the inner end 72 of the plunger, a spring assembly 80 is provided including a coil spring 81, and a spring follower 82, the latter being guided in a bore 83 formed in the guide bearing. The spring follower engages the hardened insert 38. To enable free rocking movement of the eccentric sleeve, the sleeve is formed with an elongated clearance opening 85 through which the spring 81 extends, with the outer end of the spring being seated directly in a recess 86 in the press frame. Thus, the spring force does not frictionally load the sleeve.

It will be apparent to one skilled in the art that the structure described above amply meets the objects of the invention. Because of the precise and constant phase position of the guide bearing 40, notwithstanding the rocking movement of the adjacent sleeve 50 in one direction or the other, a pure skew adjustment is obtained enabling compensation for skew of the image on the printing plate without affecting the interaxial spacing of the plate cylinder with respect to the blanket cylinder. Thus, where the proper impression is first established, subsequent skew adjustment of the plate cylinder does not affect the impression, and no touchup adjustment of the impression is necessary. Similarly, where the plate cylinder has been adjusted for skew, subsequent changes may be made in impression without having any substantial effect upon the skew.

While the invention has been described above in connection with the skew adjustment of a plate cylinder with respect to a blanket cylinder, the invention is not necessarily limited thereto and may be utilized to provide limited skew between any pair of engaged cylinders in a rotary press. Also, while it is preferred to mount the special bearing assembly 30 at the end of the cylinder which is opposite the drive end, the cylinder may possibly, but not desirably, be driven from the movable end, with the "drive" end thus being idle. Although the term "flat" has been applied to the surfaces 33, 34 on the cylinder bearing, this does not necessarily imply that the surfaces are smoothly continuous. The same comment applies to the surfaces 43, 44. Also while the term "plunger" has been applied to the element 71, and while it is preferred that this element be smoothly cylindrical, it will be understood that the term is sufficiently broad to cover elements of other specific shape which may be effectively interposed as an adjustable spacer between the frame and the cylinder bearing.

I claim:

1. An arrangement for securing pure skew adjustment of a cylinder, for example, a plate cylinder in a sheet-fed rotary printing press, relative to an adjacent cylinder, comprising, in combination, a frame including side plates, first and second cooperating cylinders having their axes normally arranged in a plane and journalled in the side plates of the frame, the first cylinder having a drive end and a remote end and having stub shaft projecting coaxially therefrom, a bearing at the drive end, a bearing assembly at the remote end fitted within a cylindrical opening in the frame, said bearing assembly including a cylinder bearing telescoped over the shaft and having flat support surfaces thereon facing radially outward in opposite directions, a guide bearing having a cylindrical outer surface and having a central window extending axially therethrough for receiving the cylinder bearing, the window defining a pair of flat way surfaces facing radially inward and spaced parallel to one another for snug reception of the flat support surfaces on the cylinder bearing, the window also defining side walls spaced apart sufficiently to permit freedom of adjustment of the cylinder bearing along the way surfaces, an eccentric sleeve fitted between the opening in the frame and the cylindrical outer surface of the guide bearing, means for rockably adjusting the eccentric sleeve to move the first cylinder toward and away from the second cylinder thereby to vary the degree of impression between them, adjusting means for positioning the cylinder bearing with respect to the way surfaces thereby to adjustably skew the first cylinder with respect to the second, and means secured to the frame for holding the guide bearing in a phase position in which the way surfaces therein are constantly oriented perpendicular to the plane which contains the axes of the cylinders notwithstanding the rocking movement of the sleeve.

2. The combination as claimed in claim 1 in which the adjusting means for the cylinder bearing is interposed directly between the frame and the cylinder bearing.

3. The combination as claimed in claim 1 in which the adjusting means for the cylinder bearing includes a plunger extending radially inward presenting its inner end to the cylinder bearing and having manual positioning means at its outer end mounted on the frame for adjusting the position of the cylinder bearing along the way surfaces, and means including a spring on the opposite side of the cylinder bearing and diammetrically opposed to the plunger for constantly urging the cylinder bearing into seated engagement on the inner end of the plunger.

4. The combination as claimed in claim 1 in which the adjusting means for the cylinder bearing includes a plunger which penetrates the side wall of the guide bearing with the inner end of the plunger in engagement with the cylinder bearing for positioning the same, and a cam shaft journalled in the frame plate at the outer end of the plunger and having means for manually rocking the same to vary the endwise position of the plunger.

5. The combination as claimed in claim 4 in which the eccentric sleeve is relieved in the region of the plunger to permit limited rocking movement of the sleeve about its axis notwithstanding the presence of the plunger.

6. An arrangement for securing pure skew adjustment of a cylinder, for example, a plate cylinder in a sheet-fed rotary printing press, relative to an adjacent cylinder, comprising, in combination, a frame including side plates, first and second cooperating cylinders having their axes normally arranged in a plane and journalled in the side plates of the frame, the first cylinder having a drive end and a remote end and having stub shafts projecting coaxially therefrom, a bearing at the drive end, a bearing assembly at the remote end fitted within a cylindrical opening in the frame, said bearing assembly including a cylinder bearing telescoped over the shaft and having a support surface thereon, a guide bearing having a cylindrical outer surface and having a flat way surface for supporting the cylinder bearing, an eccentric sleeve fitted between the opening in the frame and the cylindrical outer surface of the guide bearing, means for rockably adjusting the eccentric sleeve to move the first cylinder toward and away from the second cylinder thereby to vary the degree of impression between them, adjusting means for positioning the cylinder bearing along the way surface thereby to adjustably skew the first cylinder with respect to the second, and means secured to the frame for holding the guide bearing in a phase position in which the way surface thereon is constantly oriented perpendicular to the plane which contains the axes of the cylinders notwithstanding the rocking movement of the sleeve.

* * * * *